(12) United States Patent
Wang (10) Patent No.: US 8,965,199 B2
(45) Date of Patent: Feb. 24, 2015

(54) METHOD AND APPARATUS FOR AUTOMATICALLY RESTORING NODE RESOURCE STATE IN WSON SYSTEM

(75) Inventor: Jing Wang, Guangdong Province (CN)

(73) Assignee: ZTE Corporation, Hi-Tech Industrial Park, Nanshan District Shenzhen, Guangdong Province (CN)

( * ) Notice: Subject to any disclaimer, the term of this patent is extended or adjusted under 35 U.S.C. 154(b) by 184 days.

(21) Appl. No.: 13/259,318

(22) PCT Filed: Apr. 16, 2010

(86) PCT No.: PCT/CN2010/071830
§ 371 (c)(1),
(2), (4) Date: Dec. 28, 2011

(87) PCT Pub. No.: WO2010/145283
PCT Pub. Date: Dec. 23, 2010

(65) Prior Publication Data
US 2012/0114326 A1    May 10, 2012

(30) Foreign Application Priority Data
Jun. 29, 2009   (CN) .......................... 2009 1 0151506

(51) Int. Cl.
*H04J 14/00* (2006.01)
*G01R 31/08* (2006.01)
(Continued)

(52) U.S. Cl.
CPC ........ *H04L 41/0659* (2013.01); *H04L 43/0817* (2013.01); *H04J 14/0256* (2013.01); *H04J 14/0267* (2013.01); *H04J 14/0268* (2013.01)
USPC .................................. 398/7; 398/48; 370/216

(58) Field of Classification Search
USPC ............. 398/1–8, 30, 33, 107, 45–57, 58–59; 370/216–228
See application file for complete search history.

(56) References Cited

U.S. PATENT DOCUMENTS 5,276,861 A * 1/1994 Howarth ........................ 714/4.1
(Continued)

FOREIGN PATENT DOCUMENTS

CN         1859371 A      11/2006
CN         101325814      12/2008
(Continued)

OTHER PUBLICATIONS

Zhihong Kang, Link Connectivity and Common Constraint Information Extension to GMPLS for WDM Switched Optical Networks, Sep. 9, 2008, pp. 1-22.

*Primary Examiner* — Ken Vanderpuye
*Assistant Examiner* — Dibson Sanchez
(74) *Attorney, Agent, or Firm* — Kenneth E. Horton; Kirton McConkie (57) ABSTRACT

The present invention provides a method and apparatus for automatically restoring node resource state in the Dense Wavelength Division Multiplexing Based Automatic Switched Optical Network (WSON) system. This method comprises the following steps: using each node in the WSON system as an initiation node and notifying the resource state of the initiation node to a neighboring node; the neighboring node comparing the received resource state of the initiation node with the resource state of the present end; and under the condition that the resource state of the initiation node and that of the neighboring node are inconsistent, according to the actual resource state, determining one of the initiation node and the neighboring node to be the node whose resource is occupied, and automatically releasing the resource of the node. The present invention also provides an apparatus for automatically restoring node resource state in the WSON system. The present invention can effectively detect the problem of inconsistent wavelength resource in the WSON system caused by abnormal status, and can automatically correct the resource state information, release the link bandwidth resource occupied incorrectly, at the same time enhance the fault-tolerant capability and the stability of the WSON system.

9 Claims, 4 Drawing Sheets

(51) Int. Cl.
*H04L 12/24* (2006.01)
*H04L 12/26* (2006.01)
*H04J 14/02* (2006.01)

(56) References Cited

U.S. PATENT DOCUMENTS

| | | | |
|---|---|---|---|
| 6,088,328 A * | 7/2000 | McKnight | 370/216 |
| 6,449,257 B1 * | 9/2002 | Choi | 370/242 |
| 6,522,661 B1 * | 2/2003 | Min | 370/445 |
| 6,600,581 B1 * | 7/2003 | Fatehi et al. | 398/9 |
| 6,600,583 B1 * | 7/2003 | Fatehi et al. | 398/82 |
| 6,914,877 B1 * | 7/2005 | Alamineh | 370/217 |
| 7,031,321 B2 * | 4/2006 | Habetha | 370/395.31 |
| 7,042,882 B2 * | 5/2006 | Kano et al. | 370/395.3 |
| 7,171,120 B2 * | 1/2007 | Ozugur et al. | 398/51 |
| 7,283,741 B2 * | 10/2007 | Sadananda | 398/5 |
| 7,428,212 B2 * | 9/2008 | Saleh et al. | 370/228 |
| 7,525,989 B2 * | 4/2009 | Cline et al. | 370/468 |
| 7,630,635 B1 * | 12/2009 | Guy et al. | 398/49 |
| 7,990,946 B2 * | 8/2011 | Deguchi | 370/351 |
| 8,014,300 B2 * | 9/2011 | Zhang et al. | 370/242 |
| 8,089,864 B2 * | 1/2012 | Beller et al. | 370/222 |
| 8,307,056 B2 * | 11/2012 | Canali et al. | 709/223 |
| 8,363,553 B2 * | 1/2013 | D'Alessandro et al. | 370/238 |
| 8,521,022 B1 * | 8/2013 | Sriram et al. | 398/57 |
| 2003/0016410 A1 * | 1/2003 | Zhou et al. | 359/110 |
| 2003/0020977 A1 * | 1/2003 | Smith et al. | 359/110 |
| 2004/0246948 A1 * | 12/2004 | Lee et al. | 370/352 |
| 2005/0149632 A1 * | 7/2005 | Minami et al. | 709/237 |
| 2007/0053359 A1 * | 3/2007 | Wu et al. | 370/392 |
| 2007/0098008 A1 * | 5/2007 | Sun et al. | 370/444 |
| 2008/0031257 A1 * | 2/2008 | He | 370/395.31 |
| 2008/0205262 A1 * | 8/2008 | Suzuki | 370/216 |
| 2009/0208206 A1 * | 8/2009 | Madrahalli et al. | 398/45 |
| 2010/0074623 A1 * | 3/2010 | Skoog et al. | 398/79 |
| 2010/0202772 A1 * | 8/2010 | Wei et al. | 398/16 |
| 2013/0128725 A1 * | 5/2013 | Maggiari | 370/225 |

FOREIGN PATENT DOCUMENTS

| | | |
|---|---|---|
| CN | 101325814 A | 12/2008 |
| CN | 101605283 A | 12/2009 |
| EP | 1 881 631 A1 | 1/2008 |
| JP | 2007288662 | 1/2007 |
| KR | 20080038540 A | 5/2008 |
| WO | 9701230 | 1/1997 |

* cited by examiner

METHOD AND APPARATUS FOR AUTOMATICALLY RESTORING NODE RESOURCE STATE IN WSON SYSTEM

FIELD OF THE INVENTION

The present invention relates to the optical network field, and in particular to a method and apparatus for automatically restoring node resource state in Dense Wavelength Division Multiplexing Based Automatic Switched Optical Network (WSON) system.

BACKGROUND OF THE INVENTION

The Automatic switched optical network (ASON) is a new-generation optical transmission network capable of accomplishing the switching and interconnection functions of the optical network intelligently and automatically. The ASON is a high flexible and expansible fundamental optical network facility, using software as core and capable of providing calls from the optical layer directly according to the service demands of network and users. The ASON is formed by integrating the flexibility and efficiency of the Internet Protocol (IP), the protection capability of the Synchronous Digital Hierarchy (SDH)/the Synchronous Optical Network (SONET) and the capacity of the Dense Wavelength Division Multiplexing (DWDM) through the innovative distributed network management system.

WSON is an ASON system based on the DWDM device. The automatic switching and connection function of the system is accomplished on the basis of the automatic discovery of network resource and topological structure by calling the dynamic intelligent routing algorithm and using distributed signaling processing and interaction to establish connections between network nodes based on demands, at the same time a protection restoration mechanism can be provided to accomplish the automatic reorganization under a fault situation.

In the WSON system, a mismatch of the same wavelength resource states between adjacent network-element devices can be caused by the situation of signaling loss or node restarting when a call deletion command is sent, etc. Namely: the states of the receiving end and sending end are inconsistent. The mismatch of the wavelength resource states may lead to an occupation of the link bandwidth resource on the node device when relative call is no longer exist. If it is not processed in time, in the situation that call are established and deleted repeatedly or the mismatch of the resource states has occurred several times, it will make the call unestablishable even the bandwidth resource is available. When such fault occurs, there is no effective way to release the related resource, the only method available is to clear up the configuration database through the node and reset it, but this method may cause interruptions to all the calls going through this node and also the losing of call information, which will bring great loss to the operators.

SUMMARY OF THE INVENTION

The present invention is proposed to ensure the fault-tolerant processing mechanism and stability of the WSON system and the using efficiency of the resource through regularly detecting the information of the wavelength resource states of the network-element node in the WSON system, correcting the mismatch automatically, and releasing the occupied link bandwidth resource.

According to the present invention, a method for automatically restoring node resource state in WSON system is provided, which method comprises the following steps: using any node in the WSON system as a initiation node, regularly sending packed resource state of the initiation node to a neighboring node; the neighboring node comparing the received resource state of the initiation node with the resource state of the neighboring node; and under the condition that the resource state of the initiation node and that of the neighboring node are inconsistent, determining one of the initiation node and the neighboring node to be the node whose resource is occupied, and releasing the resource of the node whose resource is occupied.

The initiation node regularly notifies the resource state thereof to the neighboring node of it, wherein the resource refers to wavelength resource and the resource state refers to a wavelength using state.

The step that the neighboring node compares the received resource state of the initiation node with the resource state of its own comprises the following steps: the neighboring node compares the received wavelength using state in the sending direction of the initiation node with the using state of the same wavelength in the receiving direction of the neighboring node wave by wave; the neighboring node compares the wavelength using state in the receiving direction of the initiation node with the using state of the same wavelength in the sending direction of the neighboring node wave by wave; and if an inconsistency of the resource states is found in the comparison, inconsistency information is recorded and the initiation node is required to resend the wavelength using state thereof, and the comparison is processed once again, if the inconsistency of the resource states still exists, the inconsistency between the wavelength using state of the initiation node and that of the neighboring node is determined.

After determining the inconsistency between the wavelength using state of the initiation node and that of the neighboring node, the following steps are further comprised: if the link bandwidth resource of the neighboring node is not occupied, the neighboring node indicates the wavelength resource of the neighboring unavailable; if the link bandwidth resource is occupied by a call, the neighboring node reports an alarm.

The process that the node whose resource is occupied releases the resource thereof comprises the following steps: if the network manager fails to start a deleting operation within a preset time, the wavelength resource of the neighboring node is released automatically.

This method further comprises the following steps: after releasing the wavelength resource, the node reporting the alarm detects whether the wavelength using state of the initiation node is consistent with that of the neighboring node once again, if they are consistent, the neighboring node indicates the resource state available under the condition that it has been indicated unavailable or under the condition that the neighboring node has reported the alarm, an alarm-clear is reported, so as to cancel this alarm in the network manager interface.

When one of the following two conditions is met, the wavelength using states between the initiation node and the neighboring node are confirmed to be inconsistent: the same wavelength resource is occupied at one node of the initiation node and the neighboring node, but not occupied at the other node, or the same wavelength resource is occupied at both the initiation node and the neighboring node, but the connection identification at the initiation node and the neighboring node are different.

When the wavelength using states in receiving and sending directions of the neighboring node are both inconsistent with the same wavelength using states in sending and receiving directions of the initiation node, then the wavelength resource in both directions of the neighboring node is occupied, while the wavelength resource in both directions of the initiation node is released, or the wavelength resource in both directions of the initiation node is occupied while the wavelength resource in both directions of the neighboring node is released, the node whose resource is occupied reports the alarm only once.

According to another aspect of the present invention, an apparatus for automatically restoring node resource state in WSON system is provided, which apparatus comprises: a sending module, configured to use each node in the WSON system as an initiation node regularly, notify the resource state of the initiation node to a neighboring node of the initiation node; a comparison module, configured to compare the resource state of the neighboring node with that of the initiation node, if they are inconsistent, record the inconsistency information and require the initiation node to resend the resource state thereof, and process the comparison once again, if they are still inconsistent, determine the inconsistency between the resource state of the initiation node and that of the neighboring node; and a restoration module, configured to determine one of the initiation node and the neighboring node to be the node whose resource is occupied according to an actual resource state when the resource state of the initiation node and that of the neighboring node are inconsistent, and the node whose resource is occupied, automatically release the wavelength resource.

This apparatus further comprises an alarm module, configured to indicate the resource of the neighboring node unavailable when the inconsistency between the resource state of the initiation node and that of the neighboring node is detected and the link bandwidth resource of the neighboring node is not occupied; report an alarm when the link bandwidth resource of the neighboring node is occupied by a call; and detect whether the resource state of the initiation node and that of the neighboring node are consistent once again after the restoration module releases the occupied node resource, if consistency is detected, indicate the resource of the neighboring node available or report an alarm-clear when the neighboring node has already reported the alarm.

The present invention can effectively detect the problem of inconsistent wavelength resource in the WSON system caused by abnormal status, and can automatically correct the resource state information and release the link bandwidth resource occupied incorrectly, so as to avoid the interruption of all the calls going through the node and the losing of the call information caused by clearing up the configuration database through the node and resetting it, at the same time enhance the fault-tolerant capability and stability of the WSON system.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF THE EMBODIMENTS

The embodiments of the present invention will be further illustrated hereinafter in conjunction with the accompanying drawings.

Figure 1:
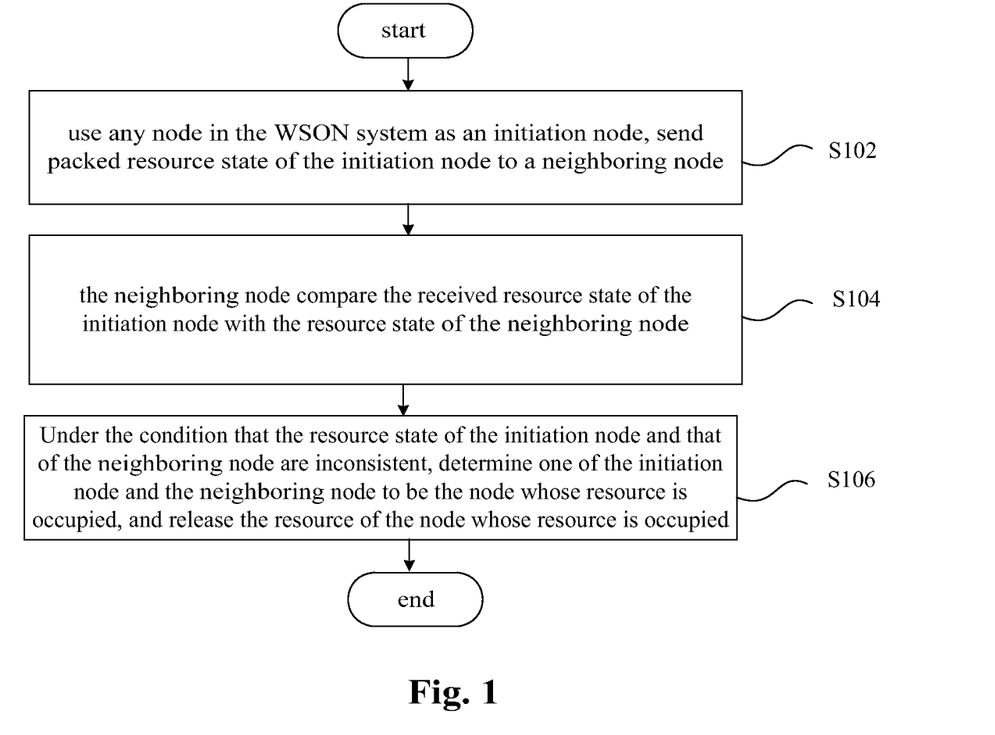
FIG. 1 shows a flow chart of a method for automatically restoring node resource state in the WSON system according to an embodiment of the present invention.

FIG. 1 shows a flow chart of a method for automatically restoring node resource state in the WSON system according to an embodiment of the present invention. As shown in FIG. 1, the method for automatically restoring node resource state in this embodiment comprises the following steps.

Step S102, each node in the WSON system acquires the information of the local wavelength resource state regularly, then packs and sends it to a neighboring node.

Step S104, the node in the WSON compares the received data packet with the local resource states wave by wave, if inconsistency exists, records the inconsistency information, requires the opposite node to resend the wavelength resource state, and determines the inconsistency of the wavelength resource states of the two nodes if inconsistency is detected again.

Step S106, after the existence of the resource state inconsistency is determined, the node whose link bandwidth resource is not occupied needs to indicate the wavelength resource of its own to be "unavailable". If the link bandwidth resource of the present node is occupied, then an alarm is reported, and the network manager interface can display the alarm information. If there is no manual operation of deletion of the alarm at the network administrator in certain time, a software starts an automatic wavelength resource correcting operation and releases this wavelength resource of all the nodes that the calls go through; if the network manager deletes the alarm in certain time, the software corrects the wavelength resource according to the command sent by the network manager and releases this wavelength resource of all the nodes that the calls go through in this step.

Step S108, the wavelength resource state is regularly detected again, and when consistency is detected, the node which fails to report an alarm indicates this wavelength resource of the present node "available"; the node which has reported an alarm reports an alarm-clear. By now, the link bandwidth resource occupied incorrectly is released completely.

Particularly, Step S102 further comprises the following steps:

Step S102-2, a multi-input-port single board for processing calls may process the detection of the resource state by taking each port wavelength resource as a unit, and conduct processing by taking each port wavelength resource as a unit in the subsequent operation of the wavelength identification modification or alarm reporting; and Step S102-3, sending data packet to the neighboring node regularly for the opposite node to detect whether the resource states are consistent; the regular packet sending time shall be set according to the actual application networking complexity of the WSON system.

Particularly, Step S104 further comprises the following steps:

Step 104-2, the resource states of the same wavelength in opposite directions, i.e. the sending and receiving directions, are compared, namely, compares the wavelength resource state in the receiving (or sending) direction of the present node with the wavelength resource state in the sending (or receiving) direction of the neighboring node;

Step S104-3, the resource state inconsistency comprises two situations: 1) the same wavelength resource of two neighboring nodes is occupied in one end and released in the other end; 2) the same wavelength resource is occupied in both ends of two neighboring nodes, but the connection identifications are different; and the resource states will be determined to be inconsistent in either case above; and Step S104-4, the present node packs a packet and sends it immediately after receiving a resending requirement from the opposite node; and if a timer is used to trigger the operation of resending the data packet, the regular resending time shall be set short.

Particularly, Step S106 further comprises the following steps:

Step S106-2, if the using states of the wavelength used by two connections in the receiving and sending directions of the same call of the present node are detected to be inconsistent with those of the neighboring node respectively, and the wavelength resource in sending and receiving directions are both occupied at the present node, the present node reports an alarm only once; in the situation mentioned in Step S106-2, when starting releasing the resource of the present node, the link bandwidth resource in both sending and receiving directions is released.

The same alarm will be reported only once in step S106-2.

Particularly, Step S108 further comprises the following steps:

Step S108-2, after the releasing of the link bandwidth resource, the present node packs the resource state packet and sends it to the neighboring node immediately, and the wavelength resource is modified to "available" after the consistency of the wavelength resource is detected by the neighboring node; and Step S108-3, the node which has reported an alarm reports an alarm-clear when the consistency of the wavelength resource is detected again.

Figure 2:
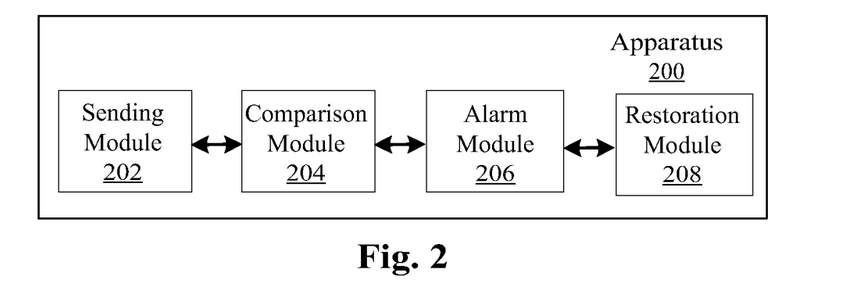
FIG. 2 shows a block diagram of an apparatus for automatically restoring node resource state in the WSON system according to an embodiment of the present invention.

FIG. 2 shows a block diagram of the modules of a WSON system according to an embodiment of the present invention. As shown in FIG. 2, the apparatus for restoring node resource state in WSON system 200 comprises: a sending module 202, configured to use each node in the WSON system as an initiation node regularly, and send the packed resource state of the initiation node to the neighboring node of the initiation node; a comparison module 204, configured to compare the resource state of the neighboring node with that of the initiation node wave by wave until the whole comparison is finished, if they are inconsistent, record the inconsistency information and require the initiation node to resend the resource state of its own, and process the comparison once again, if they are still inconsistent, then determine the inconsistency of the resource states of the initiation node and the neighboring node, and start operations of alarm reporting or temporary resource locking, etc.; and a restoration module 208, configured to release the occupied resource when the automatic restoration of the normal resource is activated or there is manual alarm deletion operation in the network manager interface.

The resource refers to the wavelength, and the resource state refers to the wavelength using state.

The apparatus further comprises an alarm module 206, under the condition that the resource states of the initiation node and the neighboring node are detected to be inconsistent in the operation of the comparison module 204, if the link bandwidth resource of the neighboring node is not occupied, the wavelength resource of the adjacent node is indicated "unavailable"; if the link bandwidth resource of the neighboring node is occupied by a call, an alarm is reported by the neighboring node. This is the general processing flow of the alarm module of all the nodes in the WSON system. After the resource of the node which has reported an alarm is released by the restoration module, whether the resource states of the initiation node and the neighboring node are consistent is detected again. If consistency of the resource states is detected, the node whose wavelength resource is modified to unavailable in the alarm module processing indicates the wavelength resource available again; the node which has reported an alarm using the alarm module reports an alarm-clear to cancel this alarm in the network manager interface.

Another embodiment of the present invention will be described in details hereinafter in conjunction with FIGS. 3-6.

The processing of the inconsistency of the wavelength resource states of the neighboring network-element nodes in the WSON system in this embodiment can realize a software-based correction of the error resource states and a releasing of the link bandwidth resource occupied incorrectly.

As the inconsistency of the resource states happens only in the case of abnormal and accidental conditions, in order to verify the method for restoring resource state in this embodiment, a situation with inconsistent resource state needs to be firstly "produced" for testing and verification. The implementation steps are as follows.

Figure 3:
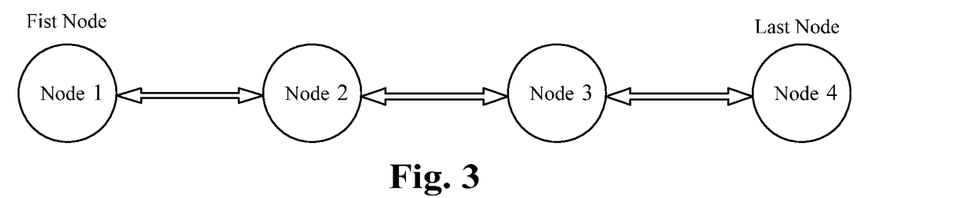
FIG. 3 shows a schematic diagram of a WSON optical network according to an embodiment of the present invention.

Step 1, establish a network, use the wavelength division equipment as the single node in the WSON system to establish the optical network shown in FIG. 3.

Step 2, establish a call by a command sent by a network manager, the first node of the call is node 1, the last node of the call is node 4 and the call goes through node 2 and node 3. The call is established successfully, and the connection wavelength of the receiving connection and the sending connection are both λ1.

Step 3, restart node 3, at the same time delete the call by a command sent by the network manager, the connections of other related nodes are deleted, and the link bandwidth resource is released. As node 3 has not carried out the deletion operation because of the restarting, related connection information still exists in the data restored from the database after restarting, the wavelength λ1 is occupied. So far, the inconsistency of the wavelength resource states of node 2-3 and node 3-4 has been produced.

Figure 4:
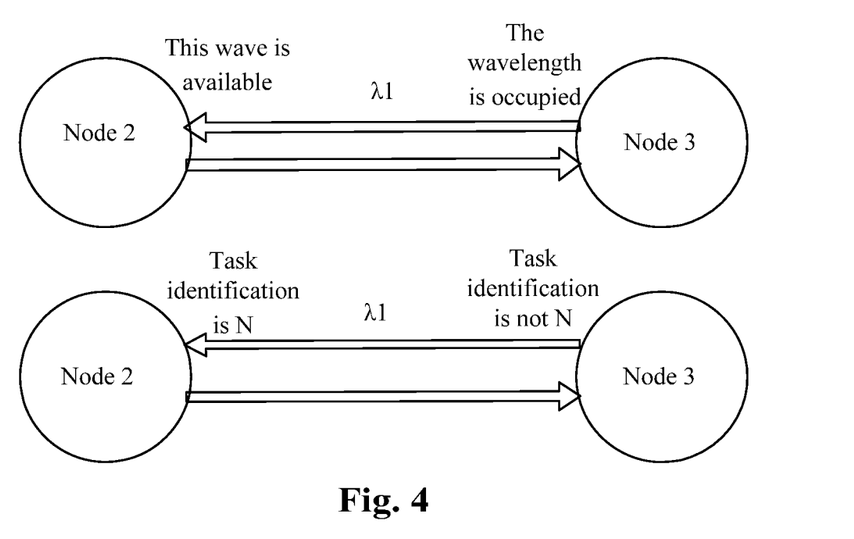
FIG. 4 shows a schematic diagram of the condition that the wavelength resource states between two adjacent nodes in the WSON network do not match with each other according to an embodiment of the present invention.
Figure 5:
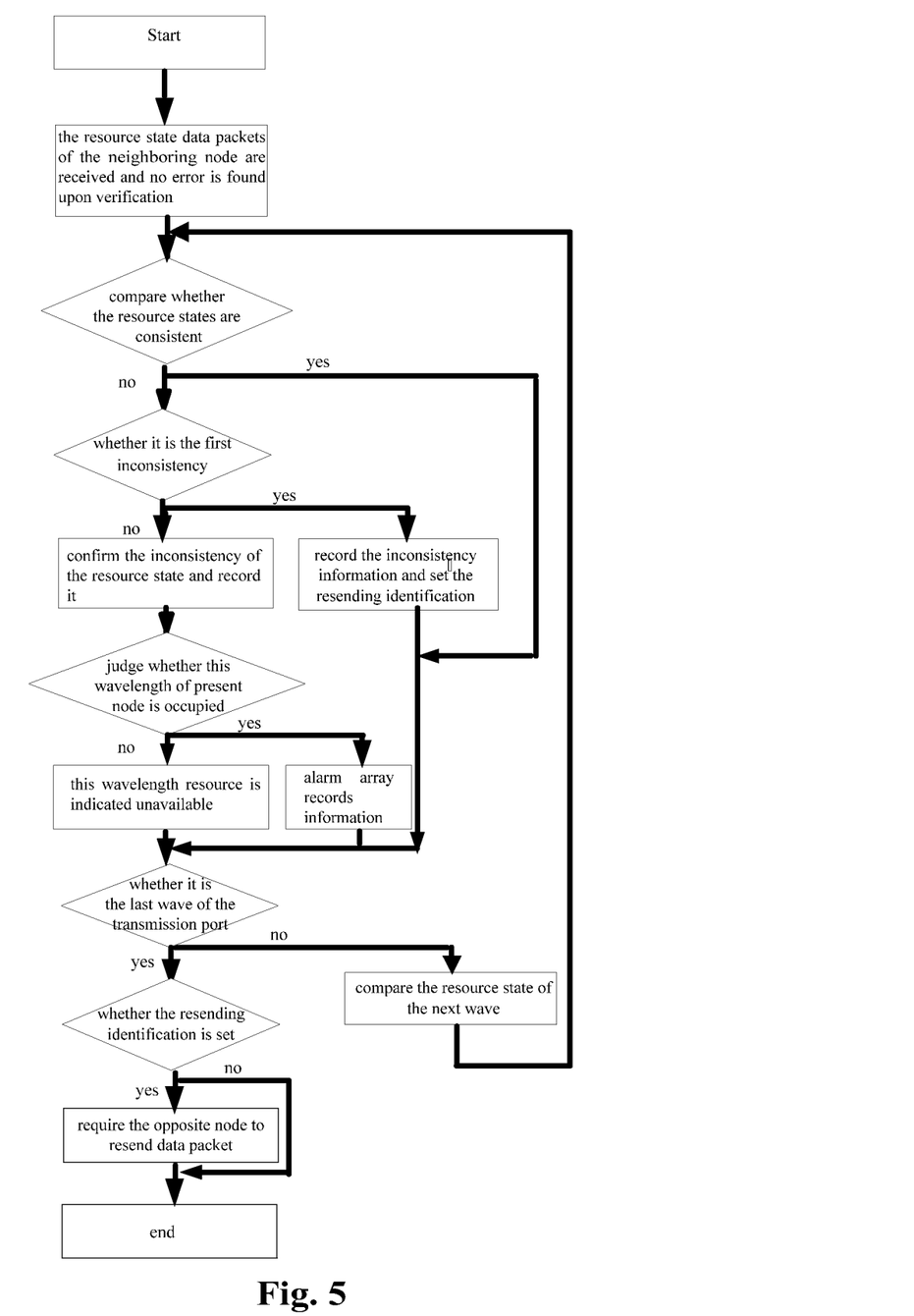
FIG. 5 shows a flow chart of the resource state detection according to an embodiment of the present invention.

Next, the detecting flow of the inconsistency of the wavelength resource states of the neighboring nods is described with reference to FIG. 4 and FIG. 5. The implementation steps are as the follows.

Firstly, node 2 and node 4 receive the local resource using state data packet of node 3 which is sent to the neighboring node regularly by node 3, node 2 and node 4 compare each wavelength resource states of the received data packet with the local resource states of the same wavelength in the opposite directions (for example, the sending direction of node 3 and the receiving direction of node 2 or node 4) wave by wave, when an inconsistency is detected for the first time, node 3 is required to resend the local resource state data packet of its own. When another inconsistency is detected, then the existence of the inconsistency of the resource states of node 2-3 is determined Secondly, as mentioned above, the flow that node 3 receives the resource state data packet from node 2 (or node 4, according to the sequence that the timer meets the preset time) and resends the data packet as required is the same with the flow of the determining the inconsistency of the resource states between node 2 and node 3 mentioned before. When the inconsistency is detected again, the inconsistency of the resource states between node 3 and node 2 is determined.

Figure 6:
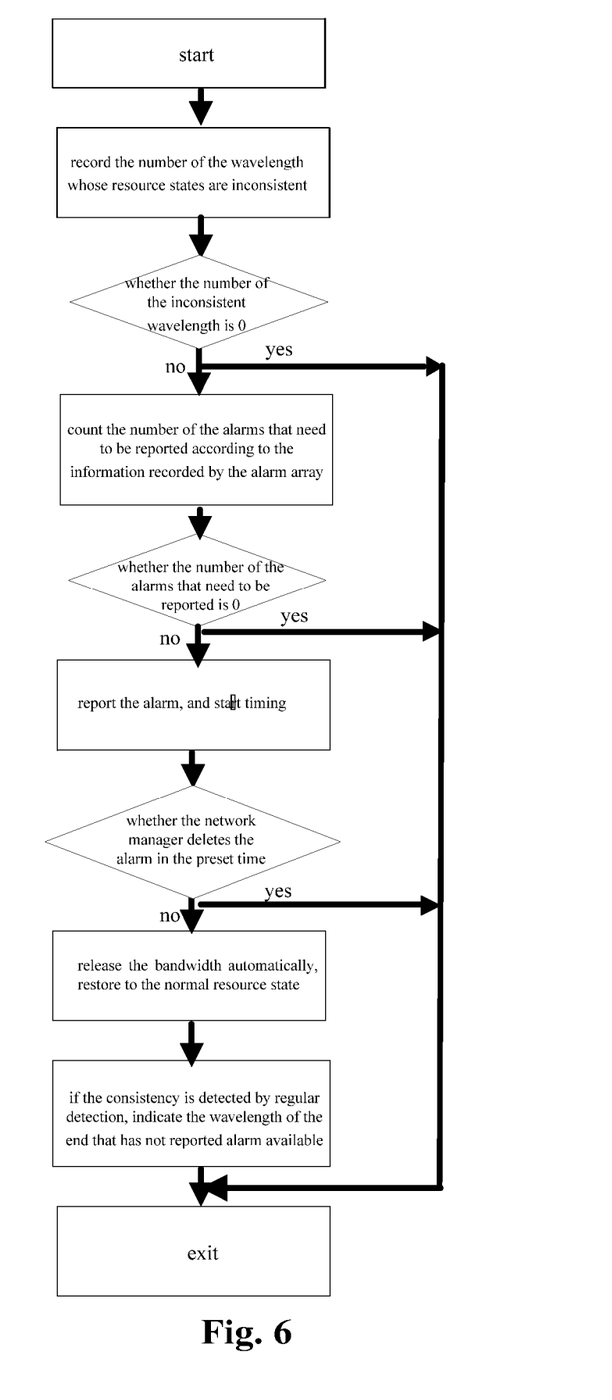
FIG. 6 shows a flow chart of the processing under the condition that the inconsistency of the resource states is detected according to an embodiment of the present invention.

Next, with reference to FIG. 6, the processing flow of the inconsistency of the wavelength resource states of the neighboring nodes are described, the implementation steps are as follows.

Step 1, node 2 indicates the local λ1 "unavailable" and notifies this state to other nodes in the WSON system to avoid other nodes establish calls by using λ1 through node 2 before the mismatch of the resource states of node 2 and node 3 is restored to be normal automatically.

Step 2, node 3 reports an alarm for the inconsistency of the resource states. At this time, the alarm information (including the additional call information) is shown in the network manager interface.

Step 3, after the network manager administrator deletes the alarm information manually, the WSON system starts to delete the interconnection data of the call in all related nodes and releases this wavelength resource, at the same time modifies the wavelength resource state of node 3.

Step 4, if the network manager administrator fails to delete the alarm information manually in certain time after the alarm is reported, the software will implement the operation of Step 3 automatically. This step ensures the capability of automatic restoration to the normal resource state of the system under the condition that there is no network manager administrator to operate the network manager.

Step 5, node 2 and node 4 receive the resource state data packet sent regularly by node 3, identify the local λ1 "available" and notify this state to other nodes in the WSON network after detecting the consistency of the λ1 resource states. So far, λ1 is available through the whole link, the call related data is deleted and the link bandwidth resource is released.

In a complex optical network, if a call goes through several nodes, it will take a long time to release the resource information in all nodes through detecting and releasing the resource by the neighboring node, and the related operation of the resource releasing needs to wait for the manually deletion of the alarm to be started, that is time-consuming and low-intelligent. The method according to this embodiment can rapidly detect the inconsistency of the resource states, automatically restore to the normal resource state and rapidly release the bandwidth resource of all the nodes through which the whole call goes.

This method can effectively detect the problem of inconsistent wavelength resource caused by abnormal status, and can automatically correct the resource state information automatically and release the link bandwidth resource occupied incorrectly, at the same time enhance the fault-tolerant capability and stability of the WSON system.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. A method for automatically restoring node resource state in a Dense Wavelength Division Multiplexing Based Automatic Switched Optical Network (WSON) system, comprising the steps of:
   using a node in the WSON system as an initiation node, regularly sending packed resource state of the initiation node to a neighboring node;
   the neighboring node comparing the received resource state of the initiation node with resource state of the neighboring node; and
   under the condition that the resource state of the initiation node and that of the neighboring node are inconsistent, determining one of the initiation node and the neighboring node to be the node whose resource is occupied, and releasing the resource of the node whose resource is occupied; wherein
   the initiation node notifies the resource state thereof to the neighboring node regularly, wherein the resource refers to wavelength resource and the resource state refers to a wavelength using state; and
   the step that the neighboring node compares the received resource state of the initiation node with the resource state of its own comprises the steps of: the neighboring node compares the received wavelength using state in the sending direction of the initiation node with the wavelength using state of the same wavelength in the receiving direction of the neighboring node one wave after one another; the neighboring node compares the wavelength using state in the receiving direction of the initiation node with the wavelength using state of the same wavelength in the sending direction of the neighboring node one wave after one another; and if an inconsistency of the resource states is found in the comparison, inconsistency information is recorded and the initiation node is required to resend the wavelength using state thereof, and the comparison is processed once again; if the inconsistency of the resource states still exists, the inconsistency between the wavelength using state of the initiation node and that of the neighboring node is determined.

2. The method according to claim 1, wherein, after determining the inconsistency between the wavelength using state of the initiation node and that of the neighboring node, the method further comprises the steps of:
   if the link bandwidth resource of the neighboring node is not occupied, the neighboring node indicates the wavelength resource of the neighboring node unavailable; and
   if the link bandwidth resource of the adjacent node is occupied by a call, the neighboring node reports an alarm.

3. The method according to claim 2, wherein the process that the node whose resource is occupied releases the resource thereof further comprises the steps of:
   if the network administrator fails to start the deleting operation within a preset time, the wavelength resource of the neighboring node is released automatically.

4. The method according to claim 3, wherein the inconsistency between the wavelength using state of the initiation node and that of the neighboring node comprises:
   the same wavelength resource is occupied at one node of the initiation node and the neighboring node, but not occupied at the other node; or the same wavelength resource is occupied at both the initiation node and the neighboring node, but the connection identification at the initiation node and the neighboring node are different.

5. The method according to claim 2, wherein, further comprising the steps of:

after releasing the wavelength resource, the node reporting the alarm detects whether the wavelength using state of the initiation node is consistent with that of the neighboring node once again, if they are consistent, the neighboring node indicates the resource state available under the condition that it has been indicated unavailable, or under the condition that the neighboring node has reported the alarm, an alarm-clear is reported.

6. The method according to claim 5, wherein the inconsistency between the wavelength using state of the initiation node and that of the neighboring node comprises:

the same wavelength resource is occupied at one node of the initiation node and the neighboring node, but not occupied at the other node; or the same wavelength resource is occupied at both the initiation node and the neighboring node, but the connection identification at the initiation node and the neighboring node are different.

7. The method according to claim 2, wherein the inconsistency between the wavelength using state of the initiation node and that of the neighboring node comprises:

the same wavelength resource is occupied at one node of the initiation node and the neighboring node, but not occupied at the other node; or the same wavelength resource is occupied at both the initiation node and the neighboring node, but the connection identification at the initiation node and the neighboring node are different.

8. The method according to claim 1, wherein the inconsistency between the wavelength using state of the initiation node and that of the neighboring node comprises:

the same wavelength resource is occupied at one node of the initiation node and the neighboring node, but not occupied at the other node; or the same wavelength resource is occupied at both the initiation node and the neighboring node, but the connection identification at the initiation node and the neighboring node are different.

9. The method according to claim 8, wherein, for a current wavelength, the node whose resource is occupied reports an alarm only once when the following situations exists: when the wavelength using states in receiving and sending directions of the neighboring node are both inconsistent with the same wavelength resource states in sending and receiving directions of the initiation node; and the wavelength resource in both directions of the neighboring node is occupied, while the wavelength resource in both directions of the initiation node is released, or the wavelength resource in both directions of the initiation node is occupied, while the wavelength resource in both directions of the neighboring node is released.

* * * * *